Feb. 1, 1938. H. A. HOGSETT 2,106,871
POULTRY FOUNTAIN
Filed April 5, 1937

INVENTOR
HERBERT A. Hogsett,
ATTORNEY.
Christian R. Nielsen.

Patented Feb. 1, 1938

2,106,871

UNITED STATES PATENT OFFICE 2,106,871

POULTRY FOUNTAIN

Herbert A. Hogsett, Pomona, Calif.

Application April 5, 1937, Serial No. 135,147

3 Claims. (Cl. 119—74)

This invention relates to drinking fountains for poultry and it consists in the construction herein described and claimed.

It is an object of the invention to provide a fountain in which the water flows continuously in a bowl member in such manner as to agitate the water to prevent freezing thereof in cold weather.

It is a further important object of the invention to provide a fountain in which the water inlet channel is positioned substantially at a tangent thereby creating a circular motion of the water discharged into a bowl of the fountain, this action effecting cleaning of the bowl of any foreign matter.

Additional objects, advantages and features of invention will be apparent from the following description and accompanying drawing, wherein—

Figure 5:
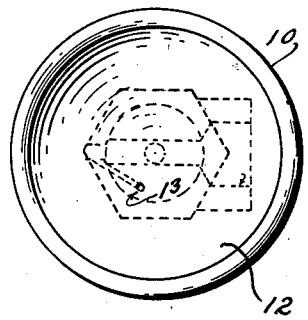
Figure 5 is a top plan view.
Figures 6, 7:
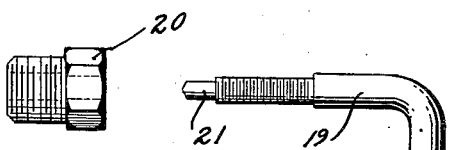
Figure 6 is a side elevation of a packing gland employed in the device.
Figure 7 is a side elevation of the needle valve.
Figure 1:
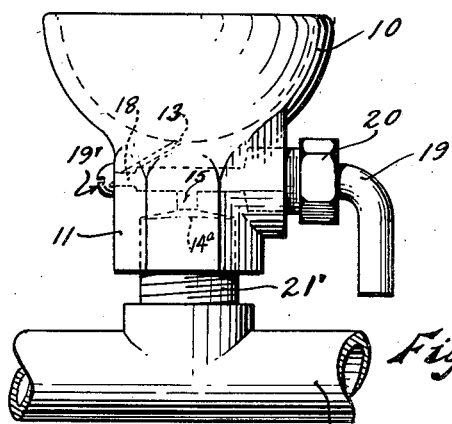
Figure 1 is a side elevation of a fountain installed upon a water supply line.
Figure 4:
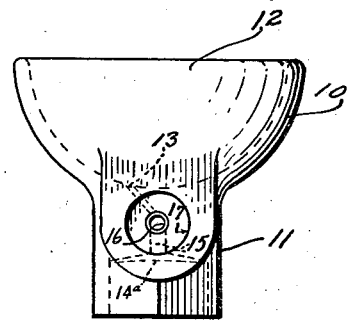
Figure 4 is a side elevation, at right angles to Figure 2, detached from the supply line.
Figure 3:
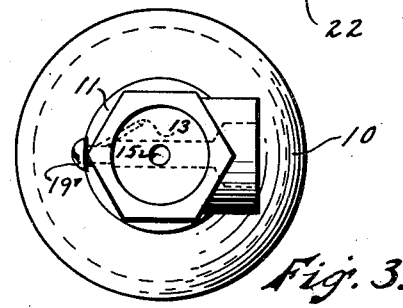
Figure 3 is a bottom view thereof.
Figure 2:
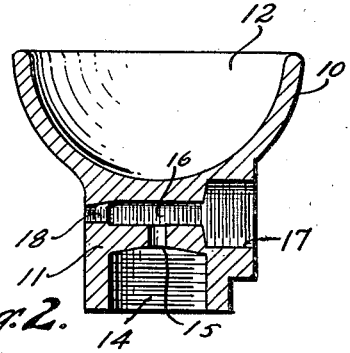
Figure 2 is a vertical sectional view of the fountain bowl.
Figure 8:
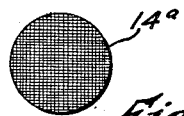
Figure 8 is a plan view of a screen employed in the inlet of the fountain.

There is illustrated a bowl 10 which may be formed of any suitable material and of any desired size and shape and comprises an integral boss 11. The cup portion 12 has a smooth, semi-spherical inner surface and in the base thereof an inlet 13 is formed.

The boss 11 has a threaded bore 14 stopping short intermediate the length of the boss, terminating in a reduced port 15. The port 15 is positioned medially of the bore 14 and opens upon a threaded bore 16 extending transversely across the axis of the bore 14. A screen 14a is seated in the bore preventing ingress of foreign matter to the valve.

One end of the bore 16 is enlarged as at 17, while the opposite end 18 is of reduced diameter. Each of the ends 17 and 18 are threaded, as shown.

A needle valve 19 is in screw threaded engagement in the bore 16, and a packing gland 20 engaged about the stem of the needle and within the threaded end 17 effectively seals the needle within the bore, and prevents leakage of water therearound. The needle valve 19 has a reduced end 21 adapted to seat in the reduced bore 18.

From the foregoing it will be seen that the needle valve 19 may be adjusted so as to regulate the flow of water through the port 15.

The inlet 13 to the cup 12 connects with the reduced bore 18 and this inlet extends substantially at a tangent to the interior surface of the bowl.

The bore 18 opens upon the outside of the boss 11 in order that the inlet port 13 may be formed, but a machine screw 19' engaged in the port closes the same. The screw is of such length as to not interfere with the full seating of the needle valve.

In use, a nipple 21' of a supply line 22 is engaged in the threaded bore 14 and the needle valve 19 adjusted so as to permit a flow of water through the port 15, bore 18 and the bowl-inlet 13. The flow of water should be sufficient to agitate the water in the bowl so as to be in motion constantly, thereby preventing freezing of the water.

Should it be desired to clean the bowl of foreign matter, the valve 19 is adjusted so as to permit a greater flow of water through the bore and ports which will set up a very rapid circular motion discharging the foreign matter over the upper edge of the bowl.

Obviously, when water is directed into a bowl in the manner described, the velocity of the water has a component tangential about the vertical axis of the bowl.

While a preferred construction has been shown and described this is by way of illustration only, and I consider as my own, all such variations in construction as fairly fall within the scope of the appended claims.

I claim:—

1. A poultry fountain comprising a bowl, a water inlet, a needle valve cooperative with the inlet for regulating the flow, said inlet opening upwardly towards the inner surface of the bowl and the axis thereof being in angular relation to a plane passing through the vertical axis of the bowl.

2. A poultry fountain comprising a bowl having a boss, a threaded bore in the boss, a second bore extended transversely of the first bore but spaced therefrom, a port connecting the two bores, and a needle valve in the second bore controlling the flow of water through the port, said bowl having an inlet in communication with an end of the second bore.

3. A poultry fountain comprising a bowl having a boss, said boss having a threaded bore for establishing connection with a supply line, a screen member in the bore, a second bore extended transversely of the first bore but spaced therefrom, a port connecting the two bores, a needle valve in the second bore controlling the flow of water through the port, and an inlet port formed between an end of the second bore and the interior of the bowl, said inlet being directed towards the inner surface of the bowl and the axis thereof being in angular relation to a plane passing through the vertical axis of the bowl.

HERBERT A. HOGSETT.